(12) United States Patent
Suyama

(10) Patent No.: US 6,333,711 B1
(45) Date of Patent: Dec. 25, 2001

(54) SATELLITE POSITIONING APPARATUS FOR MOBILE UNITS AND A NAVIGATION SYSTEM

(75) Inventor: Masaki Suyama, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/572,446

(22) Filed: May 17, 2000

(30) Foreign Application Priority Data

May 17, 1999 (JP) .................................................. 11-135488

(51) Int. Cl.[7] .................................................. H04B 7/185
(52) U.S. Cl. .............................. 342/357.14; 342/357.06; 701/213; 701/216
(58) Field of Search .................. 342/357.01, 357.06, 342/357.14; 701/213, 216, 217

(56) References Cited

U.S. PATENT DOCUMENTS

| | | | | |
|---|---|---|---|---|
| 5,353,034 | * | 10/1994 | Sato et al. ............................. | 342/457 |
| 5,459,667 | * | 10/1995 | Odagaki et al. ...................... | 364/444 |
| 5,740,049 | * | 4/1998 | Kaise .................................... | 364/450 |
| 5,794,164 | * | 8/1998 | Beckert et al. ........................ | 701/1 |
| 5,850,193 | * | 12/1998 | Shimoura et al. .................... | 340/995 |
| 5,949,375 | * | 9/1999 | Ishiguro et al. ...................... | 342/457 |
| 5,955,973 | * | 9/1999 | Anderson ............................. | 340/988 |
| 6,007,372 | * | 12/1999 | Wood .................................... | 439/502 |
| 6,009,363 | * | 12/1999 | Beckert et al. ........................ | 701/33 |
| 6,061,627 | * | 5/2000 | Sato ....................................... | 701/207 |
| 6,175,802 | * | 1/2000 | Okude et al. ......................... | 701/208 |
| 6,182,000 | * | 1/2001 | Ohta et al. ............................. | 701/55 |

* cited by examiner

Primary Examiner—Dao Phan
(74) Attorney, Agent, or Firm—McGinn & Gibb, PLLC

(57) ABSTRACT

Satellite positioning apparatus for mobile units 10 comprises a positioning unit 11 for calculating the current position of a mobile unit based on position information contained in signals from satellites received via a GPS antenna 17, state detecting units 12, 14 for outputting state detection signals corresponding to the traveling state of the mobile unit, and a calculating unit 11 for calculating the reckoned position of the mobile unit based on the state detection signal output from the state detecting unit and current position reckoning signal.

20 Claims, 4 Drawing Sheets

SATELLITE POSITIONING APPARATUS FOR MOBILE UNITS AND A NAVIGATION SYSTEM

BACKGROUND OF THE INVENTION

The present invention relates to Satellite positioning apparatus for mobile units and a navigation system equipped with a feature to calculate the reckoned position of a mobile unit after it has traveled.

In recent years, a computing system is mounted on a mobile unit which makes executable a variety of application software such as audio apparatus, television sets or navigation systems, according to the user's needs.

When the computing system executes application software of navigation, satellite positioning apparatus for mobile units is used to measure the absolute position of the mobile unit, traveling speed, and heading, etc.

FIG. 4 shows an example of use of conventional satellite positioning apparatus for mobile units. The satellite positioning apparatus for mobile units (positioning section) 51 calculates the "position, traveling speed, and heading" of the mobile unit by tracking signals received from GPS satellites via a GPS antenna 52. The satellite positioning apparatus for mobile units 51 then outputs the calculation results as GPS data output to the support module 55 of a car computing system 54 via a serial line 53. In case three satellites are acquired, two-dimensional positioning is allowed. In case four or more satellites are acquired, three-dimensional positioning is allowed. Positioning data calculated via two-dimensional positioning includes "latitude and longitude." Positioning data calculated via three-dimensional positioning includes "latitude, longitude, and altitude.

The CPU module 56 of the car computing system executes application software of car navigation to provide voice guidance and map display to the user.

The data I/O of the satellite positioning apparatus for mobile units 51 generally uses a universal asynchronous receiver/transceiver (UART). An interface is provided by a protocol control information (PCI) bus between the support module 55 which receives serial data output from the UART and the CPU module 56.

This example, however, has a problem that the car computing system 54 can use only data from the satellite positioning apparatus for mobile units 51 in order to execute application software of car navigation, resulting in reduced car position reckoning capability compared with a system dedicated for car navigation.

This is because, in a system dedicated for car navigation, the dead reckoning (DR) procedure is followed. The DR collects information from a gyro sensor and a speed sensor on a car to reckon the travel distance and heading of the car in addition to the absolute position information input to the satellite positioning apparatus for mobile units 51 for deciding the position of the car then makes map matching on the overall results obtained from such information.

SUMMARY OF THE INVENTION

To solve the above problem, a configuration example shown in FIG. 5 is proposed. In this example, an analog-to-digital converter (ADC) 59 as a data interface to the gyro sensor 58 and a counter 61 as an interface to the speed sensor 60 are provided in the support module 55. By collecting pertinent data from the support module 55 and outputting the data to the CPU via the PCI bus, the system lets the CPU module 56 to execute application software of complex car position reckoning via DR and GPS.

Note that it impairs advantages and philosophy that the car computing system makes executable a variety of applications according to the user's needs to provide hardware interfaces such as the satellite positioning apparatus for mobile units 51, gyro sensor 58, and speed sensor 60 for dedicated use in order to execute application software of car navigation. The car-mounted car computing system 54 must be of a compact size. Thus providing a large number of connectors for data interfaces has physical constraints.

An alternative approach is to incorporate the satellite positioning apparatus for mobile units 51 and gyro sensor 58 in the car computing system 54 in order to reduce the number of hardware interfaces. This implementation also betrays the philosophy of the car computing system 54. Moreover, this implementation hinders compact-design apparatus and burdens the user who does not need the car navigation feature with unnecessary costs.

The purpose of the invention is thus to provide compact-design-oriented satellite positioning apparatus for mobile units and a car navigation system preferably connected to a car computing system and do not burden the user who does not need the car navigation feature with unnecessary costs.

The first aspect of the invention is satellite positioning apparatus for mobile units using satellites provided on a mobile unit for reckoning the current position of the mobile unit, characterized in that the satellite positioning apparatus for mobile units comprises positioning section for reckoning the current position of the mobile unit based on the position information contained in signals from the satellites, state detecting section for outputting a state detection signal corresponding to the traveling state of the mobile unit, and calculating section for calculating the reckoned position of the mobile unit based on the state detection signal output from the state detecting section and the current position reckoning signal.

The second aspect of the invention is satellite positioning apparatus for mobile units according to the first aspect, characterized in that the state detecting section is a gyro sensor.

The third aspect of the invention is satellite positioning apparatus for mobile units according to the first aspect, characterized in that the state detecting section is a speed sensor.

The fourth aspect of the invention is satellite positioning apparatus for mobile units according to any one of the first aspect through the third aspect, characterized in that the satellite positioning apparatus for mobile units comprises signal converting section for converting an output signal output from the calculating section representing the reckoned position of the mobile unit to a predetermined transmission signal.

The fifth aspect of the invention is satellite positioning apparatus for mobile units according to the fourth aspect, characterized in that the transmission system of the predetermined transmission signal is a daisy chain.

The sixth aspect of the invention is satellite positioning apparatus for mobile units according to the fourth aspect, characterized in that the predetermined transmission signal is transmitted via a universal serial bus.

The seventh aspect of the invention is a car navigation system comprising a car computing system which allows position display of a mobile unit and satellite positioning apparatus for mobile units using satellites for reckoning the current position of the mobile unit, connected to the car computing system, characterized in that the satellite positioning apparatus for mobile units comprises positioning section for reckoning the current position of the mobile unit based on the position information contained in signals from the satellites, state detecting section for outputting a state detection signal corresponding to the traveling state of the mobile unit, calculating section for calculating the reckoned position of the mobile unit based on the state detection signal output from the state detecting section and the current position reckoning signal, and signal converting section for converting an output signal from the calculating section to a predetermined transmission signal, and that the car computing system comprises an interface for receiving the predetermined transmission signal.

The eighth aspect of the invention is a car navigation system according to the seventh aspect, characterized in that the state detecting section is a gyro sensor.

The ninth aspect of the invention is a car navigation system according to the seventh aspect, characterized in that the state detecting section is a speed sensor.

The tenth aspect of the invention is a car navigation system according to any one of the seventh aspect through the ninth aspect, characterized in that the car navigation system comprises signal converting section for converting an output signal output from the calculating section representing the reckoned position of the mobile unit to a predetermined transmission signal.

The eleventh aspect of the invention is a car navigation system according to the tenth aspect, characterized in that the transmission system of the predetermined transmission signal is a daisy chain.

The twelfth aspect of the invention is a car navigation system according to the tenth aspect, characterized in that the predetermined transmission signal is transmitted via a universal serial bus.

DETAILED DESCRIPTION OF THE PREFERRED EMBODIMENTS

An Embodiment according to the invention will be described with reference to the drawings.

Figure 1:
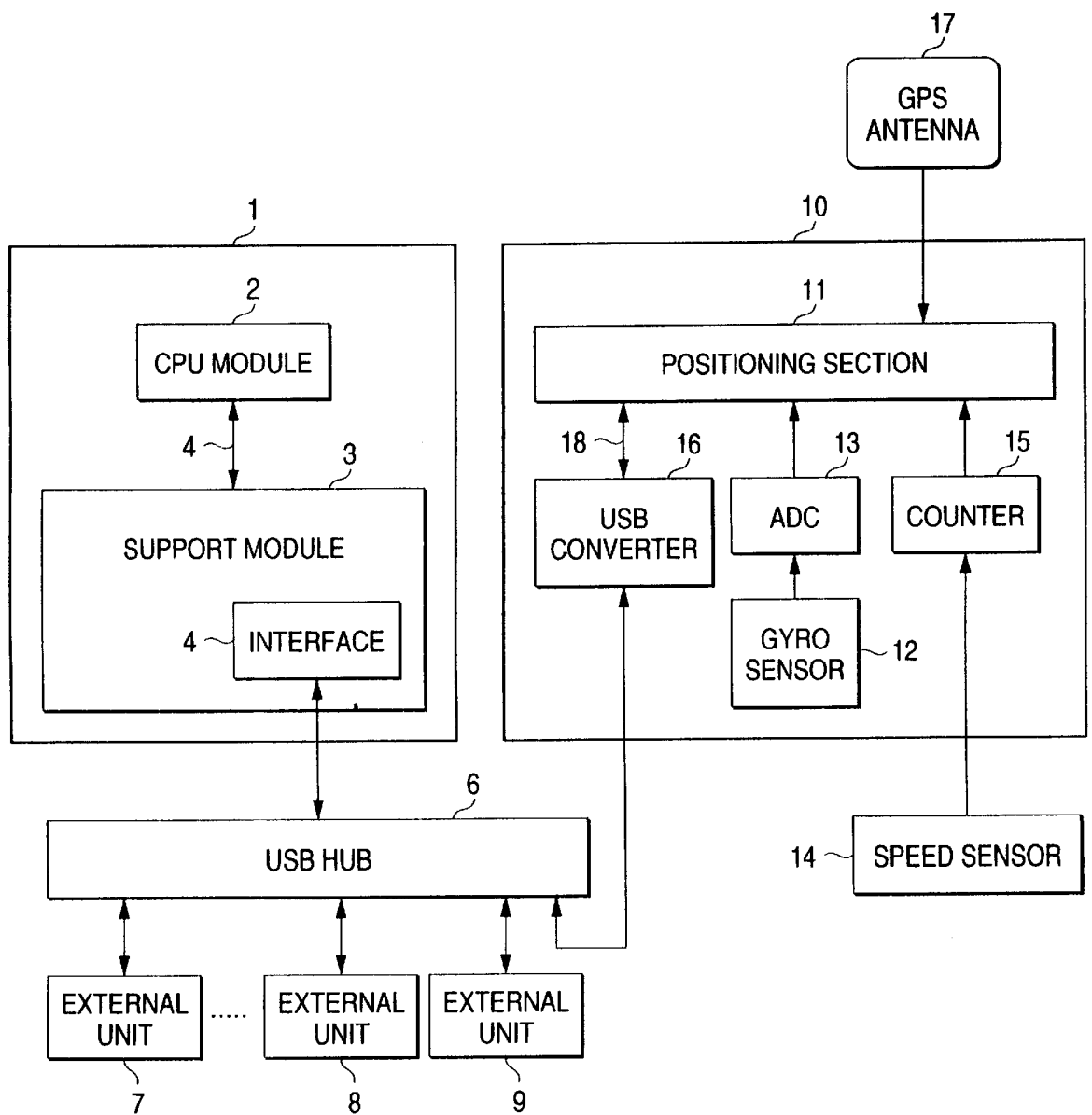
FIG. 1 is a block diagram of an embodiment according to the invention.

In FIG. 1, a car-mounted car computing system 1 is shown. The car computing system 1 has a CPU module 2 and a support module 3. An interface is provided by a PCI bus between the support module 3 and the CPU module 2. The support module 3 has an interface 5 which receives signals transmitted via a universal serial bus (USB). The interface 5 is connected to an USB hub 6, to which a variety of apparatus such as CD/MD changers 7, 8 and a television set 9. In this embodiment, satellite positioning apparatus for mobile units 10 is connected to the USB hub in order to execute application software of car navigation.

The satellite positioning apparatus for mobile units 10 comprises positioning section 11 for calculating the "position, traveling speed, and heading" of the mobile unit by tracking signals from GPS satellites received via a GPS antenna 52 and outputs the calculation results as GPS data, a gyro sensor (state detecting section) 12 required for dead reckoning (DR), an ADC 13 as an interface thereof, a counter (state detecting section) 15 as an interface for collecting speed pulses from a speed sensor 14, also being information required for DR, and an USB converter 16.

By having the aforementioned hardware configuration, the satellite positioning apparatus for mobile units has the DR feature for reckoning the relative travel distance and heading of the car in addition to the GPS satellite positioning as section for reckoning the absolute position of the car. Such complex reckoning of the car via the GPS satellite positioning and DR is performed by the CPU (calculation section) possessed by the positioning section 11. Output signal from the CPU is input to the USB converter via a serial line 18.

The USB converter exchanges I/O serial data for USB data. The term USB converter is not in general use but used for the purpose of explanation. The USB converter 16 allows the satellite positioning apparatus for mobile units 10 and the car computing system 1 to communicate with each other via the USB.

In case the complex position reckoning (calculation) of the car via aforementioned GPS satellite positioning and DR is executed by the CPU possessed by the positioning section 11, each calculation is not made independently from one another but overall judgment is made from the number of GPS satellites being acquired and calibration status of the output from the gyro sensor 12 and the speed sensor 14 to output an appropriate solution as required.

Such a positioning solution is transmitted to the car computing system 1 via the USB. The CPU module 2 of the car computing system 1 executes processing such as map matching on this positioning solution.

The following explains the aforementioned calculation in three plain state examples:

(1) In case at least three GPS satellites are acquired and the output from the gyro sensor 12 and the speed pulse is adequately calibrated, the solution of GPS satellite positioning and the solution of DR are used as parameters for the position reckoning filter. These conditions provides the most accurate reckoning of the car position.

(2) In case at least three GPS satellites are acquired but the output from the gyro sensor 12 and/or the speed pulse is inadequately calibrated, the solution to GPS satellite positioning is used as an output solution.

(3) Two or less GPS satellites are acquired and the output from the gyro sensor 12 and the speed pulse is adequately calibrated, the current position reckoned using the DR results from the most recent reckoned position with the highest reliability is used as an output solution.

Note that the aforementioned examples are in plain form. In an actual reckoning filter algorithm, it is desirable to reasonably calculate a solution which is expected to obtain the highest reliability and to select it as a final output solution.

The car computing system 1 is a system having the greatest advantage of enhancing hardware flexibility by connecting necessary external units mainly via the USB, in case the application software requested by the user need such external units.

In this embodiment, satellite positioning apparatus for mobile units 10 has the USB converter 16 for converting serial data to USB, thus allowing the satellite positioning apparatus for mobile units 10 to be connected to the car computing system 1 via the USB hub 6, in parallel with other external units 7, 8, 9.

In this embodiment again, the satellite positioning apparatus for mobile units 10 comprises hardware and software for reasonably calculate the reckoned position of the car from a solution of GPS satellite positioning and a DR solution used in case the car computing system 1 executes application software having the performance equivalent to that of a system dedicated for car navigation. This eliminates the need for providing an interface for the gyro sensor 12 or speed sensor 14 in the car computing system 1.

Thus, a large number of connectors for data interfaces are not required. This attains compact-size design of apparatus.

Serial (daisy chain) connection is possible in a transmission system implemented via the USB. In this case, it is also possible to link the satellite positioning apparatus for mobile units 10 and other external units 7, 8, 9 in daisy chain to the car computing system 1 without using the USB hub 6, as shown in FIG. 2.

Figure 3:
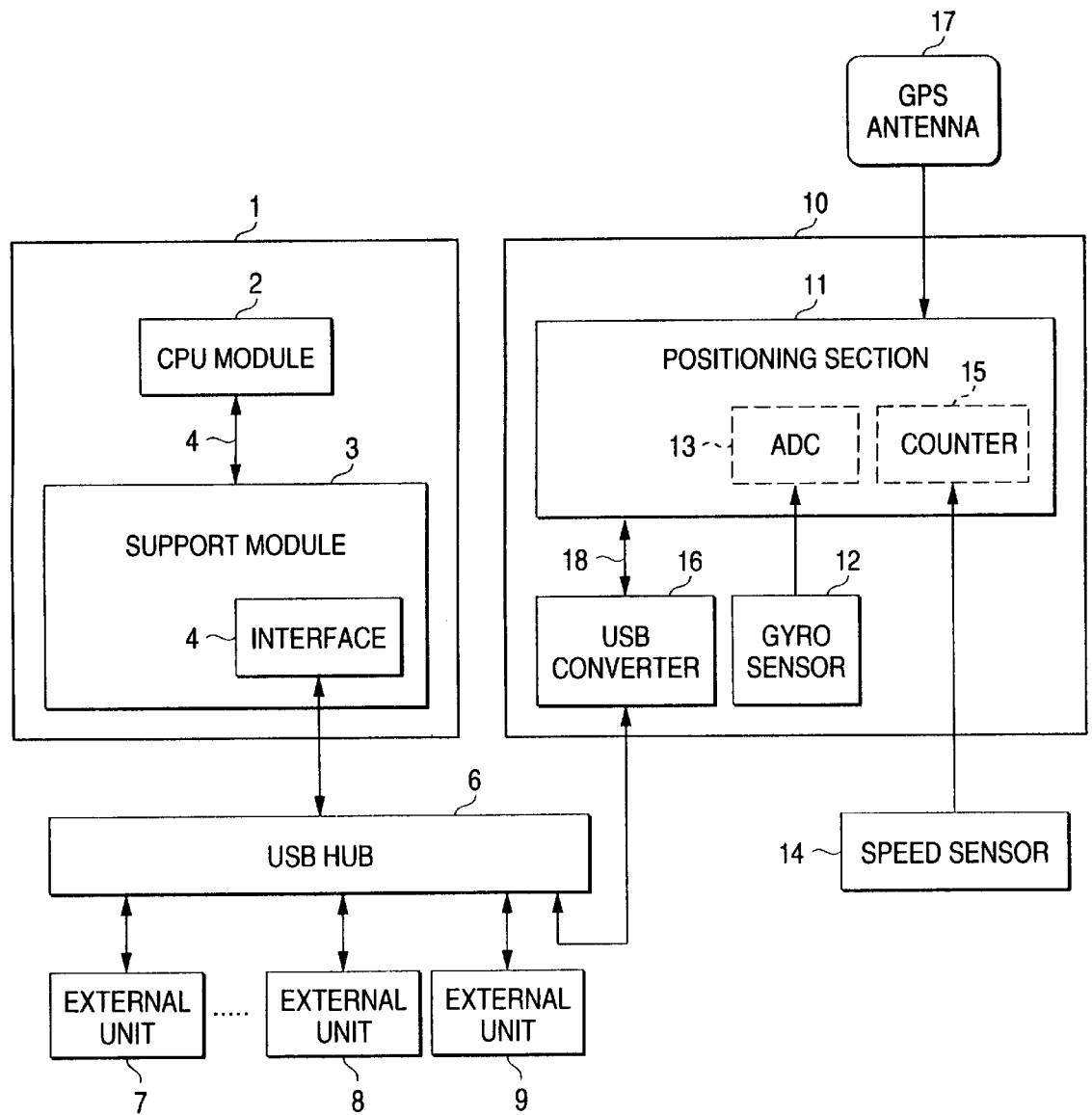
FIG. 3 is a block diagram of an alternative embodiment according to the invention.
Figure 4:
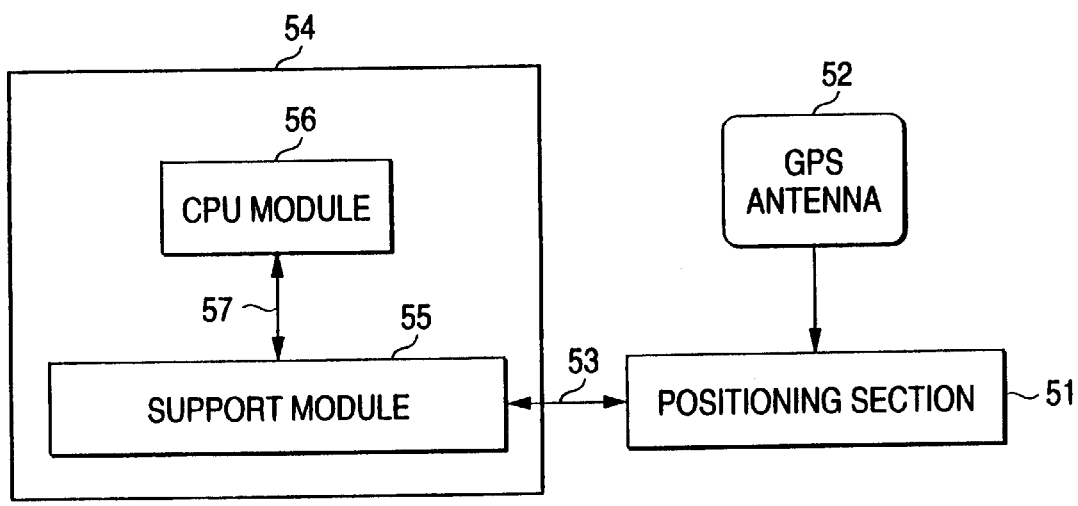
FIG. 4 is a block diagram of a conventional satellite positioning apparatus for mobile units.
Figure 5:
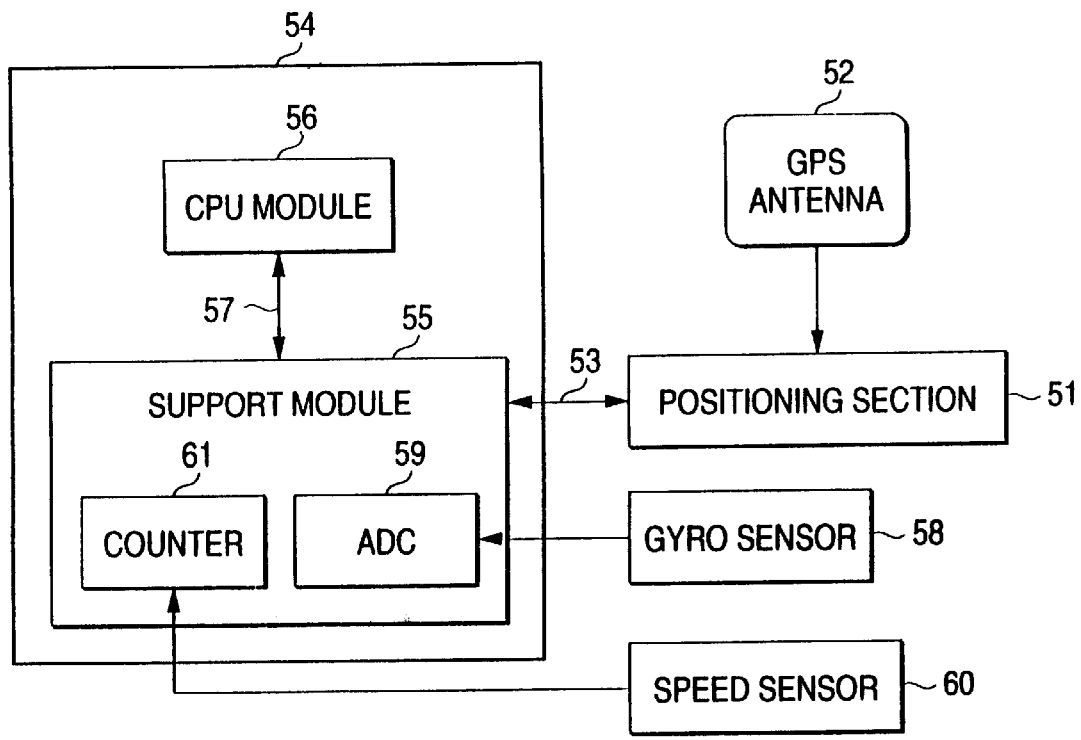
FIG. 5 is a block diagram of a conventional satellite positioning apparatus for mobile units.

FIG. 3 shows an example of a positioning section 11 where part of hardware configuration is different from the positioning section 11 shown in FIG. 1, in that the positioning section 11 in FIG. 3 comprises an ADC 13 and a counter 15, the remaining part basically being the same. Typically, the positioning section 11 comprises a CPU for calculation. In many case, the CPU incorporates the ADC 13 and/or counter 15. FIG. 3 shows an example where the CPU incorporates both of them. In this embodiment, the ADC 13 and the counter 15 in the positioning section 11 can be effectively utilized.

Figure 2:
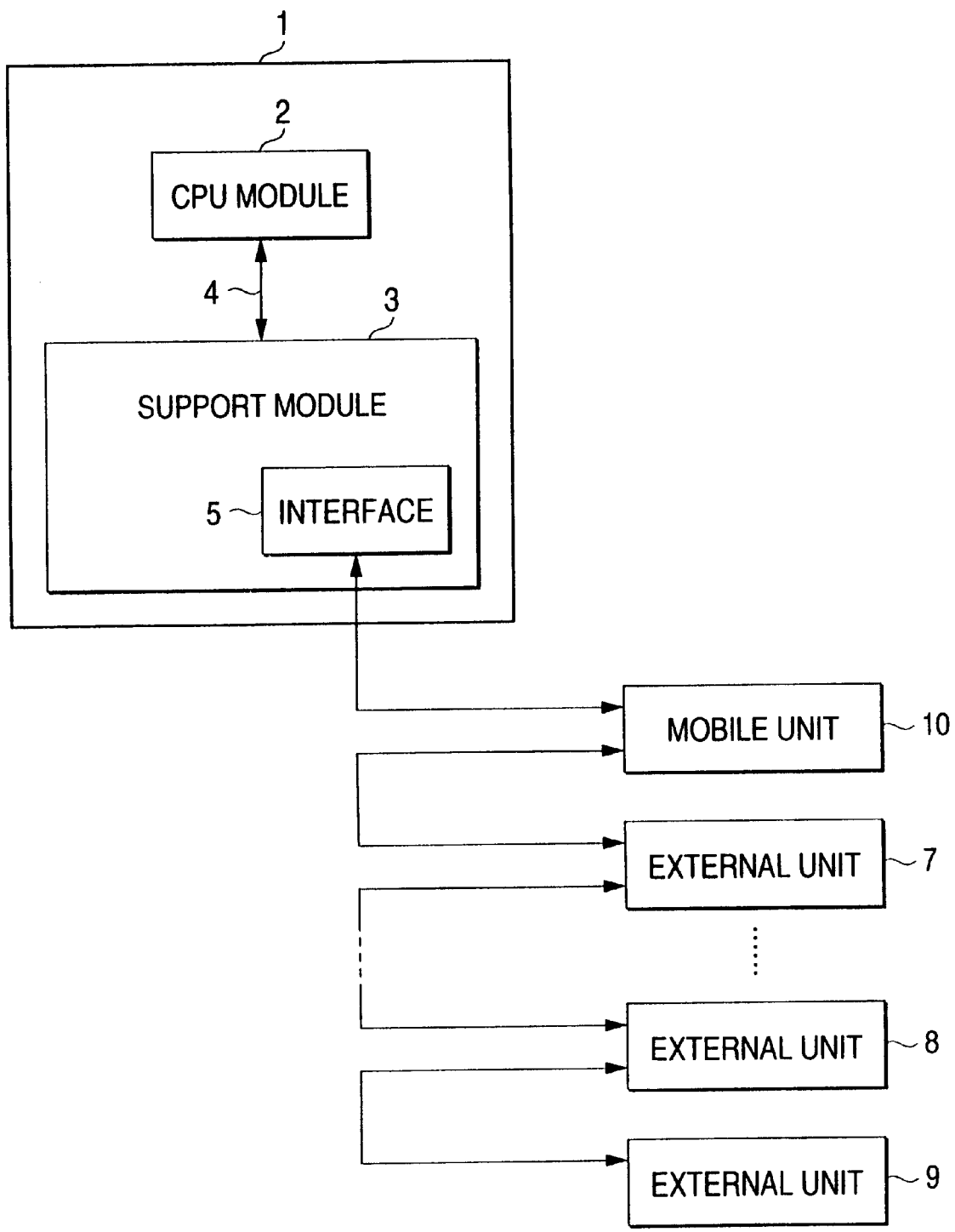
FIG. 2 is a block diagram of an alternative embodiment according to the invention.

In examples given in FIGS. 1 to 3, the gyro sensor 12 is installed in the satellite positioning apparatus for mobile units 10. In an alternative embodiment, the gyro sensor 12 can be installed outside the satellite positioning apparatus for mobile units 10 via some interface. This difference does not restrict the scope of the invention.

While the invention has been described based on an embodiment, it is clear that the present invention is not restricted to this embodiment.

The spirit of the invention is to provide satellite positioning apparatus for mobile units whose positioning performance is remarkably upgraded by providing interface circuits for the gyro sensor 12 and the speed sensor 14 on the substrate of satellite positioning apparatus for mobile units 10 as an external unit used by the car computing system 1, or on a substrate for mounting satellite positioning apparatus for mobile units 10, and by providing the CPU of the satellite positioning apparatus for mobile units 10 with DR calculation feature also, wherein communications between the satellite positioning apparatus for mobile units and the car computing system as a host are made via the USB. The invention may be otherwise variously embodied without departing from the spirit.

According to the invention, there are provided compact-design-oriented satellite positioning apparatus for mobile units and a car navigation system preferably connected to a car computing system and do not burden the user who does not need the car navigation feature with unnecessary costs.

In the above embodiments, the present invention is applied to a car as an example of a mobile unit. However, it is not defined to apply the present invention to a car, and it is possible to apply the present invention to any mobile unit.

What is claimed is:

1. A satellite positioning apparatus provided on a mobile unit for reckoning a current position of said mobile unit, said apparatus comprising:

a positioning section for reckoning a current position of said mobile unit based on position information contained in signals from satellites, and outputting a current position reckoning signal, a state detecting section for outputting a state detection signal corresponding to a traveling state of said mobile unit, and a calculating section for calculating a reckoned position of said mobile unit based on said state detection signal and said current position reckoning signal, wherein said apparatus is removably connected to a computing system via a single data interface.

2. The satellite positioning apparatus according to claim 1, wherein said state detecting section comprises a gyro sensor.

3. The satellite positioning apparatus according to claim 1, wherein said state detecting section comprises a speed sensor.

4. A satellite positioning apparatus provided on a mobile unit for reckoning a current position of said mobile unit, said apparatus comprising:

a positioning section for reckoning a current position of said mobile unit based on position information contained in signals from satellites and outputting a positioning reckoning signal;

a state detecting section for outputting a state detection signal corresponding to a traveling state of said mobile unit;

a calculating section for calculating a reckoned position of said mobile unit based on said state detection signal and said current position reckoning signal; and a signal converting section for converting an output signal output from said calculating section representing the reckoned position of said mobile unit to a predetermined transmission signal.

5. The satellite positioning apparatus according to claim 4, wherein said predetermined transmission signal is transmitted via a daisy chain.

6. The satellite positioning apparatus according to claim 4, wherein said predetermined transmission signal is transmitted via a universal serial bus.

7. A navigation system comprising a computing system which allows position display of a mobile unit and satellite positioning apparatus for mobile units using satellites for reckoning the current position of the mobile unit, connected to the computing system, said satellite positioning apparatus for mobile units comprising:

positioning section for reckoning the current position of the mobile unit based on the position information contained in signals from said satellites, state detecting section for outputting a state detection signal corresponding to the traveling state of said mobile unit, calculating section for calculating the reckoned position of said mobile unit based on the state detection signal output from the state detecting section and the current position reckoning signal, and signal converting section for converting an output signal from the calculating section to a predetermined transmission signal, wherein said computing system comprises an interface for receiving said predetermined transmission signal.

8. The navigation system according to claim 7, wherein said state detecting section is a gyro sensor.

9. The navigation system according to claim 7, wherein said state detecting section is a speed sensor.

10. The navigation system according to claim 7, further comprising:

signal converting section for converting an output signal output from said calculating section representing the reckoned position of the mobile unit to a predetermined transmission signal.

11. The navigation system according to claim 10, wherein a transmission system of said predetermined transmission signal is a daisy chain.

12. The navigation system according to claim 10, wherein said predetermined transmission signal is transmitted via a universal serial bus.

13. The satellite positioning apparatus according to claim 1, wherein a signal from said calculating section is used to execute application software for navigation.

14. A satellite positioning apparatus provided on a mobile unit for reckoning a current position of said mobile unit, said apparatus comprising:

a positioning section for reckoning a current position of said mobile unit based on position information contained in signals from satellites, and outputting a current position reckoning signal, a state detecting section for outputting a state detection signal corresponding to a traveling state of said mobile unit, and a calculating section for calculating a reckoned position of said mobile unit based on said state detection signal and said current position reckoning signal, wherein said apparatus is removably connected to a computing system, and wherein said apparatus employs a dead reckoning protocol to reckon a travel distance and heading of said mobile unit.

15. The satellite positioning apparatus according to claim 1, wherein said apparatus is removably connected to a computing system via a universal serial bus.

16. The satellite positioning apparatus according to claim 1, wherein said calculating section comprises a central processing unit comprising an analog to digital converter and a counter for collecting speed pulses from said state detecting section.

17. A satellite positioning apparatus provided on a mobile unit for reckoning a current position of said mobile unit, said apparatus comprising:

a positioning section for reckoning a current position of said mobile unit based on position information contained in signals from satellites, and outputting a current position reckoning signal, a state detecting section for outputting a state detection signal corresponding to a traveling state of said mobile unit, and a calculating section for calculating a reckoned position of said mobile unit based on said state detection signal and said current position reckoning signal, wherein said apparatus is removably connected to a computing system, and wherein said apparatus and external units are connected to said computing system at a single data interface.

18. The satellite positioning apparatus according to claim 17, wherein a signal from said calculating section and a signal from an external unit are transmitted in parallel.

19. The satellite positioning apparatus according to claim 17, wherein a signal from said calculating section and a signal from an external unit are serially transmitted.

20. A satellite positioning apparatus provided on a mobile unit for reckoning a current position of said mobile unit, said apparatus comprising:

a positioning section for reckoning a current position of said mobile unit based on position information contained in signals from satellites, and outputting a current position reckoning signal, a state detecting section for outputting a state detection signal corresponding to a traveling state of said mobile unit, and a calculating section for calculating a reckoned position of said mobile unit based on said state detection signal and said current position reckoning signal, wherein said apparatus is removably connected to a computing system, and wherein a signal from said calculating section depends upon a number of satellites acquired by said apparatus, and a calibration status of an output of said state detecting section.

* * * * *